Patented Nov. 2, 1948

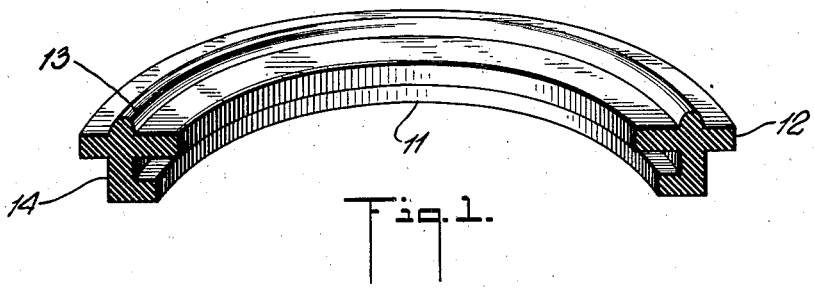
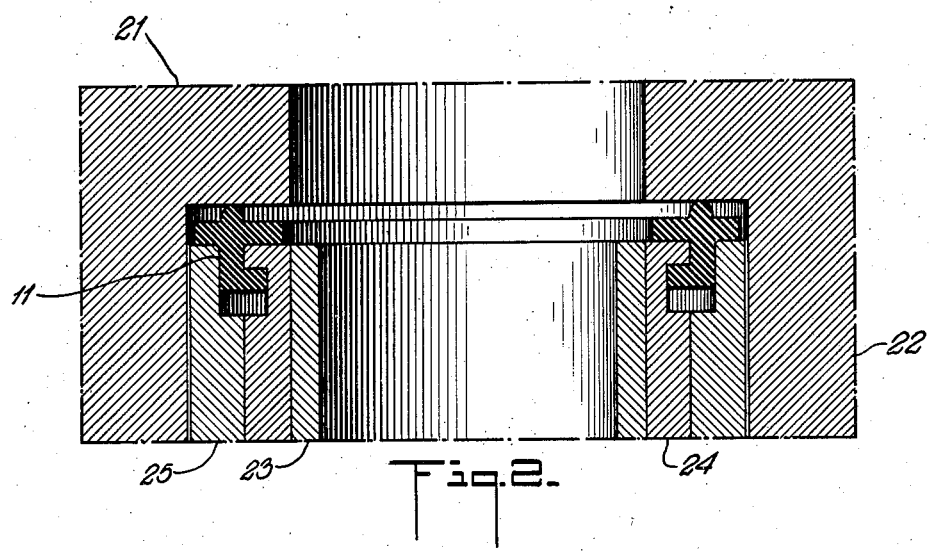
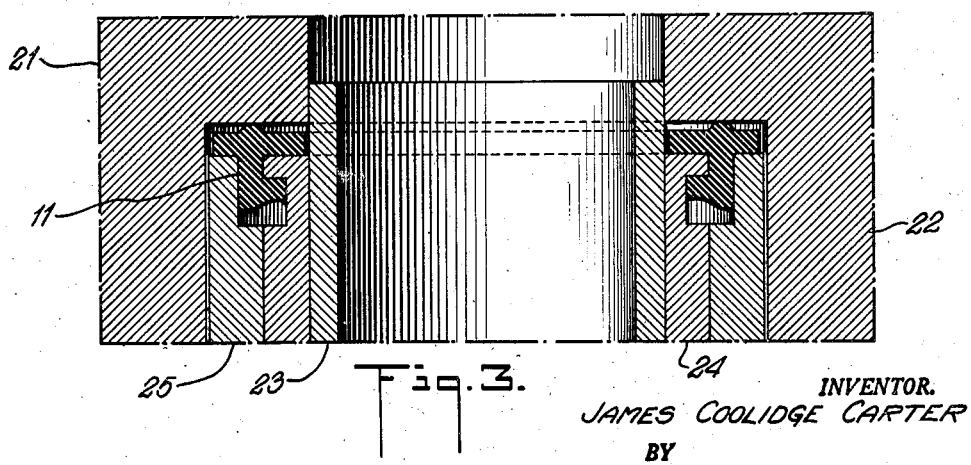

2,452,832

UNITED STATES PATENT OFFICE 2,452,832

SEALING UNIT AND GASKET

James Coolidge Carter, Pasadena, Calif.

Application December 3, 1946, Serial No. 713,770

4 Claims. (Cl. 285—1)

This invention relates to sealing units and gaskets and more particularly to gaskets adapted to seal coupling unit members where manufacturing tolerances result in a substantial variation in fit between these members.

Accordingly, the principal object of this invention is to provide a coupling gasket which will seal greater spacings between its members than heretofore possible.

Another object of this invention is to provide a coupling gasket which not only will seal greater spacings between its members than heretofore possible, but also will maintain such a seal even though the coupling is subjected to twisting stresses and strains.

Another object of this invention is to provide such a gasket with no appreciable lateral expansion as it is compressed between the coupling members.

Still another object of this invention is to provide a coupling unit employing the aforesaid gasket and particularly adapted to utilize its desirable characteristics and in which lateral expansion of the gasket is minimized.

Other and further objects of this invention will appear during the course of the following description when taken with the accompanying drawings, in which:

Fig. 1 shows a sectional perspective view of a gasket according to this invention;

Fig. 2 is a cross-sectional view of a coupling utilizing the gasket of Fig. 1 with the gasket partially engaged; and, Fig. 3 is a cross-sectional view of the coupling of Fig. 2 with the gasket in the fully-engaged position.

Referring to the drawings, in Fig. 1 is shown one-half of a gasket 11 according to this invention adapted to seal a cylindrical coupling, preferably of some suitable resilient material such as natural or synthetic rubber. The gasket comprises a flat ring 12 having an embossed or raised portion or bead 13 following its contour and positioned atop the ring. Extending from the bottom of ring 12 and disposed opposite portion 13 is an L-shaped tongue 14 as shown whose purpose is to lock the gasket in place upon the end of a coupling member as will be described hereinafter in connection with Fig. 2. Whereas ordinary gaskets cannot seal closures greater than .030 inch, exhaustive tests have proved conclusively that similar gaskets constructed of synthetic rubber according to this invention insure a positive seal for closures up to .090 inch. The importance of this 300% increased effectiveness for sealing devices is self-evident.

In Fig. 2 is shown a cross-section through a coupling including the gasket of Fig. 1, the two halves of the coupling being positioned such that gasket 11 just completes the closure therebetween, the coupling not yet being in a fully-engaged position. This coupling is similar to the one shown in my co-pending application for patent covering Underwing fueling nozzles and valves for aircraft, Serial No. 705,545, filed October 25, 1946. It comprises one coupling member 21 having an extended portion as at 22 for the purpose of guiding the other half of the coupling into position. The portion of the coupling at 22 may also additionally serve as part of a retaining device for the coupling as, for instance, part of a bayonet joint. The other member of the coupling is composed of three concentric hollow members 23, 24, and 25, one inside the other respectively. As shown, the inner surface of member 25 at its terminal end is milled away and an annular groove is cut in the outer opposing surface of member 24 to receive the L-shaped portion 14 of gasket 11. It will be noted that gasket 11 does not entirely fill the annular groove and recess provided between members 24 and 25, an air-filled pocket thus being formed below gasket 11. Ring-shaped portion 12 of gasket 11 fits snugly against the terminal ends of members 24 and 25 but as shown does not quite extend to their inner and outer edges respectively. The embossed portion or bead 13 extends up to contact the opposing surface of coupling member 21, and inner member 23 is slidable within member 24 as will be pointed out hereinafter in connection with Fig. 3.

In Fig. 3 is shown the embodiment of Fig. 2 with the coupling fully engaged so that, as shown, compression is exerted upon gasket 11, this compression being borne mainly by embossed portion 13. This compression upon portion 13 results in the shank of the L-shaped portion 14 being subjected to a force which causes the gasket to be deformed as shown, flowing down into the space provided between members 24 and 25 and against the pressure of any entrapped air. This is facilitated in the preferred form of the invention through the use of natural or synthetic rubber or the like in making the gasket. By the use of a gasket 11 of suitable resilient material according to this invention, it will thus be seen that compression between coupling units produce little, if any, lateral expansion of the ring-shaped portion of the gasket while, nevertheless, insuring a tight resilient fit between the coupling members. Thus inner member 23 can freely slide within member 24 and also, if desired, up into member 21 in the position illustrated. The L-shaped portion 14 of gasket 11 is utilized as shown to secure the gasket to the lower half of the coupling unit, this being very desirable in case the coupling must be connected and disconnected frequently. It will be obvious, however, that should this feature not be desired, L-shaped portion 14 might equally well be made in the form of a straight tongue, coupling members 24 and 25 then being modified accordingly.

Numerous additional applications of the above-described principles will occur to those skilled in the art and no attempt has here been made to exhaust such possibilities. The scope of the invention is defined in the following claims.

I claim:

1. In a coupling unit, a member having a sealing face at one end and including a channel opening to said face and normal thereto, a resilient gasket overlying said face and having a tongue projecting from one face thereof and fitting in but not bottoming in said channel, said gasket having on its other face and substantially opposite said tongue a sealing bead so disposed that pressure against said bead on sealing will cause the material of said gasket to be pressed into said channel prior to material expansion of said gasket along said sealing face.

2. In a coupling unit, a member having a sealing face at one end and including a channel of L-shaped cross-section opening to said face, the lateral extension of said channel being spaced from said sealing face, a resilient gasket overlying said face and having an L-shaped tongue projecting from one face thereof and fitting in but not bottoming in said channel to lock said gasket against displacement from said face, said gasket having on its other face and substantially opposite said L-shaped tongue a sealing bead so disposed that pressure against said bead on sealing will cause the material of said gasket to be pressed into said channel prior to material expansion of said gasket along said sealing face.

3. In a coupling unit, a member having a sealing face at one end and including a channel of L-shaped cross-section opening to said face, the lateral extension of said channel being spaced from said face, a resilient gasket overlying said face and having an L-shaped tongue projecting from one face thereof and fitting in but not completely filling said channel to lock said gasket against displacement from said face, said gasket having on its other face and substantially opposite said L-shaped tongue a sealing bead so disposed that pressure against said bead on sealing will cause the material of said gasket to be pressed into said channel prior to material expansion of said gasket along said sealing face.

4. A resilient gasket having a pair of faces, a projecting rib of L-shaped cross-section extending from one face thereof, the lateral extension of said rib being spaced from said one face to form an anchoring member, and a sealing bead extending from the other face thereof substantially opposite said rib.

JAMES COOLIDGE CARTER.

REFERENCES CITED

The following references are of record in the file of this patent:

UNITED STATES PATENTS

| Number | Name | Date |
|--------|------|------|
| 783,030 | O'Brien | Feb. 21, 1905 |
| 983,095 | Vlach | Oct. 26, 1909 |